(12) United States Patent  
Hayashi

(10) Patent No.: US 6,546,064 B1  
(45) Date of Patent: Apr. 8, 2003

(54) SYNCHRONIZATION ACQUIRING METHOD SYNCHRONIZATION ACQUIRING APPARATUS

(75) Inventor: Hiroshi Hayashi, Tokyo (JP)

(73) Assignee: Oki Electric Industry Co., Ltd. (JP)

( * ) Notice: Subject to any disclaimer, the term of this patent is extended or adjusted under 35 U.S.C. 154(b) by 0 days.

(21) Appl. No.: 09/323,957

(22) Filed: Jun. 2, 1999

(30) Foreign Application Priority Data

Sep. 16, 1998 (JP) .......................................... 10-261297

(51) Int. Cl.[7] ................................................ H04L 7/00
(52) U.S. Cl. ........................ 375/354; 375/142; 375/150
(58) Field of Search ................................ 375/142, 150, 375/354

(56) References Cited

U.S. PATENT DOCUMENTS

| | | | |
|---|---|---|---|
| 6,178,193 B1 * | 1/2001 | Kondo ..................... | 375/130 |
| 6,205,167 B1 * | 3/2001 | Kamgar et al. ............. | 375/133 |
| 6,266,364 B1 * | 7/2001 | Ishida ..................... | 375/142 |
| 6,310,856 B1 * | 10/2001 | Taipale .................... | 370/208 |

* cited by examiner

*Primary Examiner*—Stephen Chin  
*Assistant Examiner*—Kevin Kim  
(74) *Attorney, Agent, or Firm*—Venable; Robert Frank; Jeffri Kaminski

(57) ABSTRACT

A synchronization acquiring method capable of reducing the length of time required to perform in wireless communication a synchronization acquiring operation is provided when the mobile station transits from a sleep state to an active state. A synchronization acquiring apparatus capable of performing such a synchronization acquiring method is also provided. The method has the following three steps. In the first step, multiple correlation values are obtained between the input data supplied from a base station to the mobile station and multiple phases of a spreading code multiplied to the input data in the mobile station before the mobile station transits from the active state to the sleep state, multiple phases of the spreading code that correspond to the correlation values are determined, and the multiple phases are stored. In the second step, phases of the spreading code multiplied to the input data are determined using the phase when the mobile station transits from the sleep state to the active state. In the third step, correlation values between the input data and the phases of the spreading code multiplied to the input data are obtained using the phases of the spreading code determined in the second step.

10 Claims, 7 Drawing Sheets

EXPLANATION OF OPERATION OF
CORRELATION RECEIVER(1)

EXPLANATION OF OPERATION OF
CORRELATION RECEIVER(2)

SYNCHRONIZATION ACQUIRING METHOD SYNCHRONIZATION ACQUIRING APPARATUS

BACKGROUND OF THE INVENTION

1. Field of the Invention

The present invention relates to a synchronization acquiring method for matching the phase of a spreading code, which is used to spread data at a base station so as to enable the mobile station to communicate by radio with the base station, with the phase of a spreading code, which is used at the mobile station to de-spread input data that is used to de-spread the input data input from the base station, and a synchronization acquiring apparatus for carrying out the synchronization acquiring method. The act of matching the phase of the spreading code used at the base station with the phase of the spreading code used at the mobile station is called synchronization.

2. Description of Related Art

Two types of operations for performing a synchronization at the mobile station are known. One of them is a synchronization acquiring operation and the other is a synchronization tracking operation.

When a power source is turned on at the mobile station, the mobile station performs a synchronization acquiring operation. Conventionally, the sliding correlating system has been used for the synchronization operation. In the sliding correlating, the phases of a spreading code to be multiplied with the input data are slid so as to be de-spread the input data supplied from the base station, a de-spread result is obtained for each of the phases, and a phase that maximizes the correlation value is obtained from the de-spread result. When the power source is turned on at the mobile station, the mobile station slides the phases of the spreading code by entire bits of the spreading code in the sliding correlating system so as to perform the above-described synchronization acquiring operation. In such a synchronization acquiring operation, the number of phases of the spreading code to be slid by the sliding correlating system is large. Therefore, it requires a long time to perform the synchronization acquiring operation.

The mobile station performs a synchronization tracking operation after the synchronization acquiring operation. In the synchronization tracking operation, the mobile station maintains the state of synchronization between the phases of the spreading code, on which the synchronization acquiring operation has been performed, and the input data that is serially input to the mobile station. For example, a conventional synchronization tracking apparatus in which a PLL circuit (Phase Locked Loop Circuit) is used is able to realize such a synchronization tracking operation.

In general, the mobile station shifts to a sleep state when the mobile station is put into a waiting state while performing a synchronization tracking operation in order to reduce power consumption. While the mobile station is in the sleep state, the mobile station periodically monitors for any input data supplied from the base station while maintaining the state of inactivity. When no data is supplied from the base station, the mobile station remains in the sleep state. If any input data is received during the sleep state, the mobile station shifts from the sleep state to an active state. The mobile station performs a synchronization acquiring operation again to shift to the active state. The same sliding correlating system is used in the synchronization acquiring operation. When the mobile station shifts from the sleep state to the active state, the mobile station repeats exactly the same operation that the mobile station performed when the mobile station last shifted to the active state. Therefore, the mobile station requires a long length of time to perform the synchronization acquiring operation.

SUMMARY OF THE INVENTION

Given these problems, it is an object of the present invention to provide a synchronization acquiring method capable of reducing the length of time required to perform in wireless communication a synchronization acquiring operation when the mobile station shifts from a sleep state to an active state and a synchronization acquiring apparatus capable of performing such a synchronization acquiring method.

In order to achieve the above-stated objective, a synchronization acquiring method according to the embodiments of present invention has the following three steps. In, the first step multiple correlation values are obtained between the input data supplied from a base station to the mobile station and multiple phases of a spreading code multiplied with the input data in the mobile station before the mobile station transits from the active state to the sleep state, multiple phases of the spreading code that correspond to the correlation values are determined, and the multiple phases are stored. In the second step, phases of the spreading code multiplied with the input data are determined using the phases obtained when the mobile station transits from the sleep state to the active state. In the third step, correlation values between the input data and the phases of the spreading code multiplied with the input data are obtained using the phases of the spreading code determining in the second step.

Preferably in the second step, it is judged whether the mobile station has been moved or not while the mobile station was in the sleep state when the mobile station transits from the sleep state to the active state. If the mobile station has remained at rest, the phases of the spreading code are determined using the multiple phases stored in the first step. If the mobile station has been moved, the size of a range, over which the phases of the spreading code are slid, are determined to be equal to the entire range that corresponds to the length of the spreading code.

In order to achieve the above-stated objective, a synchronization acquiring apparatus according to embodiments of the present invention has a correlation storing unit which obtains correlation values between the input data supplied from the base station and the spreading code multiplied with the input data and stores the correlation values and the phases of the spreading code that correspond to the correlation values, and an operation control unit which judges whether a synchronization acquiring operation has been completed or not based on the correlation value stored in the correlation storing unit, sends the phases to synchronization tracking apparatus when the operation control unit judges that the synchronization acquiring operation has been completed, performs a control so as to repeat the synchronization acquiring operation when the operation control unit judges that the synchronization acquiring operation has not been completed, and receives the multiple phases stored in the synchronization tracking apparatus to control the correlation storing unit using the phase stored in the synchronization tracking apparatus and the phase differences between the phases stored in the synchronization tracking apparatus when the mobile station transits from the sleep state to the active state.

Preferably, the correlation storing unit of the synchronization acquiring apparatus according to the present invention has a first spreading code generating unit which, when a first starting phase is input from a phase control unit, generates a spreading code sliding a phase from the first starting phase over a prescribed range and generates the spreading code sliding a phase over a prescribed range that corresponds to the length of the spreading code when a control signal is input from a control unit, a first de-spreading unit which multiplies the spreading code generated by the first spreading code generating unit to the input data and outputs first demodulated data, a second spreading code generating unit which, when a second starting phase is input from the phase control unit, generates a spreading code sliding a phase from the second starting phase over a prescribed range and generates the spreading code sliding a phase over a prescribed range that corresponds to the length of the spreading code when a control signal is input from the control unit, a second de-spreading unit which multiplies the spreading code generated by the second spreading code generating unit to the input data and outputs second demodulated data, a correlation generating unit which outputs correlation values between the input data and the spreading code based on the first demodulated data and the second demodulated data, and a first memory which receives phases of the spreading code that generates the peaks of the correlation values based on the correlation values from the first de-spreading unit and stores the correlation values and the phases of the spreading code. Also preferably, the operation control unit has a control unit which receives the correlation values stored in the first memory, judges whether the synchronization acquiring operation has been completed or not based on the correlation values, sends the phases stored in the first memory to a second memory installed inside the synchronization tracking apparatus when the operation control unit judges that the synchronization acquiring operation has been completed sends a reset signal for repeating the synchronization acquiring operation to the first de-spreading unit and the second de-spreading unit when the operation control unit judges that the synchronization acquiring operation has not been completed, and reads at least two phases stored in the second memory of the synchronization tracking apparatus to output the phases and a phase difference between the phases when the mobile station transits from the sleep state to the active state, and a phase control unit which outputs the first starting phase and the second starting phase using the phases and the phase difference output from the control unit.

More preferably, the correlation generating unit of the synchronization acquiring apparatus according to the present invention has a first accumulating unit which outputs the cumulative value of the first demodulated data as first cumulative data, a second accumulating unit which outputs the cumulative value of the second demodulated data as second cumulative data, an adder which calculates the sum of the first cumulative data and the second cumulative data, and an amplitude calculating unit which calculates the amplitude of the sum and outputs the amplitude as the correlation value.

More preferably, the correlation generating unit of the synchronization acquiring apparatus according to the present invention has an adder which calculates the sum of the first demodulated data and the second demodulated data, an accumulating unit which accumulates the sum calculated by the adder to produce a cumulative sum and outputs the cumulative sum as cumulative data, and an amplitude calculating unit which calculates the amplitude of the cumulative data and outputs the amplitude as the correlation value.

More preferably, the correlation generating unit of the synchronization acquiring apparatus according to the present invention has a first accumulating unit which outputs the cumulative value of the first demodulated data as first cumulative data, a second accumulating unit which outputs the cumulative value of the second demodulated data as second cumulative data, a first amplitude calculating unit which calculates the amplitude of the first cumulative data and outputs the first cumulative data as a first correlation value, a second amplitude calculating unit which calculates the amplitude of the second cumulative data and outputs the second cumulative data as a second correlation value, and an adder which calculates the sum of the first correlation value and the second correlation value. The correlation generating unit then outputs the sum obtained by the adder as the correlation value.

More preferably, the correlation generating unit of the synchronization acquiring apparatus according to the present invention has a first accumulating unit which outputs the cumulative value of the first demodulated data as first cumulative data, a second accumulating unit which outputs the cumulative value of the second demodulated data as second cumulative data, a first amplitude calculating unit which calculates the amplitude of the first cumulative data and outputs the first cumulative data as a first correlation value, a second amplitude calculating unit which calculates the amplitude of the second cumulative data and outputs the second cumulative data as a second correlation value, a first square calculating unit which calculates the square of the first correlation value and outputs the square of the first correlation value as a first squared correlation value, a second square calculating unit which calculates the square of the second correlation value and outputs the square of the second correlation value as a second squared correlation value, and an adder which calculates the sum of the first squared correlation value and the second squared correlation value. The correlation generating unit then outputs the sum obtained by the adder as the correlation value.

More preferably, the correlation generating unit of the synchronization acquiring apparatus according to the present invention has a first accumulating unit which outputs the cumulative value of the first demodulated data as first cumulative data, a second accumulating unit which outputs the cumulative value of the second demodulated data as second cumulative data, a first amplitude calculating unit which calculates the amplitude of the first cumulative data and outputs the first cumulative data as a first correlation value, a second amplitude calculating unit which calculates the amplitude of the second cumulative data and outputs the second cumulative data as a second correlation value, a first square calculating unit which calculates the square of the first correlation value and outputs the square of the first correlation value as a first squared correlation value, a second square calculating unit which calculates the square of the second correlation value and outputs the square of the second correlation value as a second squared correlation value, and an adder which calculates the sum of the first squared correlation value and the second squared correlation value. The synchronization acquiring apparatus further has a first additional memory which receives the phase of the spreading code that generates the peak of the first squared correlation value based on the first squared correlation value from the first de-spreading unit and stores the phase, and a second additional memory which receives the phase of the spreading code that generates the peak of the second squared correlation value based on the second squared correlation value from the second de-spreading unit and stores the phase. Moreover, the operation control unit has a control unit which receives the phase stored in the first additional memory and said phase stored in the second additional memory, sends the phase stored in the first additional memory and the phase stored in the second additional memory to the second memory installed inside the synchronization tracking apparatus when the operation control unit judges that the synchronization acquiring operation has been completed, sends a reset signal for repeating the synchronization acquiring operation to the first de-spreading unit and the second de-spreading unit when the operation control unit judges that the synchronization acquiring operation has not been completed, and reads at least two phases stored in the second memory of the synchronization tracking apparatus to output the phases and a phase difference between the phases when the mobile station transits from the sleep state to the active state, and a phase control unit which outputs the first starting phase and the second starting phase using the phases and the phase difference output from the control unit.

More preferably, the first additional memory of the synchronization acquiring apparatus according to the present invention receives the phase of the spreading code that generates the peak of the first squared correlation value based on the first correlation value from the first de-spreading unit and stores the phase, and the second additional memory receives the phase of the spreading code that generates the peak of the second squared correlation value based on the second correlation value from the second de-spreading unit and stores the phase.

DETAILED DESCRIPTION OF THE INVENTION

Normally, a synchronization acquiring apparatus installed in a mobile station outputs multiple correlation values for a signal of the same channel received from the base station. It is inferred that the electromagnetic wave carrying the input data transmitted from the base station is caused to travel multiple distinct paths due to the influence of the surrounding environment, and is received by the mobile station. It is inferred that, as a result, these multiple distinct correlation values are generated by the difference between the lengths of the multiple paths. Each of the correlation values that the synchronization acquiring apparatus outputs and the phases of the spreading code that correspond to the correlation values are held constant as long as the operator of the mobile station remains at rest at the same position. This invention is focused on the phases of the spreading code that correspond to the multiple correlation values output by the synchronization acquiring apparatus and the difference between the phases. In what follows, the term "phases" will refer to the phases of spreading code that multiply input data supplied to the mobile station.

When the mobile station transits from the sleep state to the active state, the synchronization acquiring apparatus of embodiments of the present invention performs a synchronization acquiring operation by first sliding the phases over a prescribed range using a reference one of the multiple correlation values obtained by the synchronization tracking apparatus before the mobile station was shifted into the sleep state and then uses the sliding correlating system.

The synchronization acquiring apparatus stores the phases of the other correlation values that had been obtained by the synchronization tracking apparatus before the mobile station was put to the sleep state.

In what follows, preferred embodiments of the present invention will be explained with reference to the attached drawings. However, the range of technical applications of the present invention is not restricted to the following embodiments.

(First Embodiment)

First, the first embodiment of the present invention will be explained.

Figure 1:
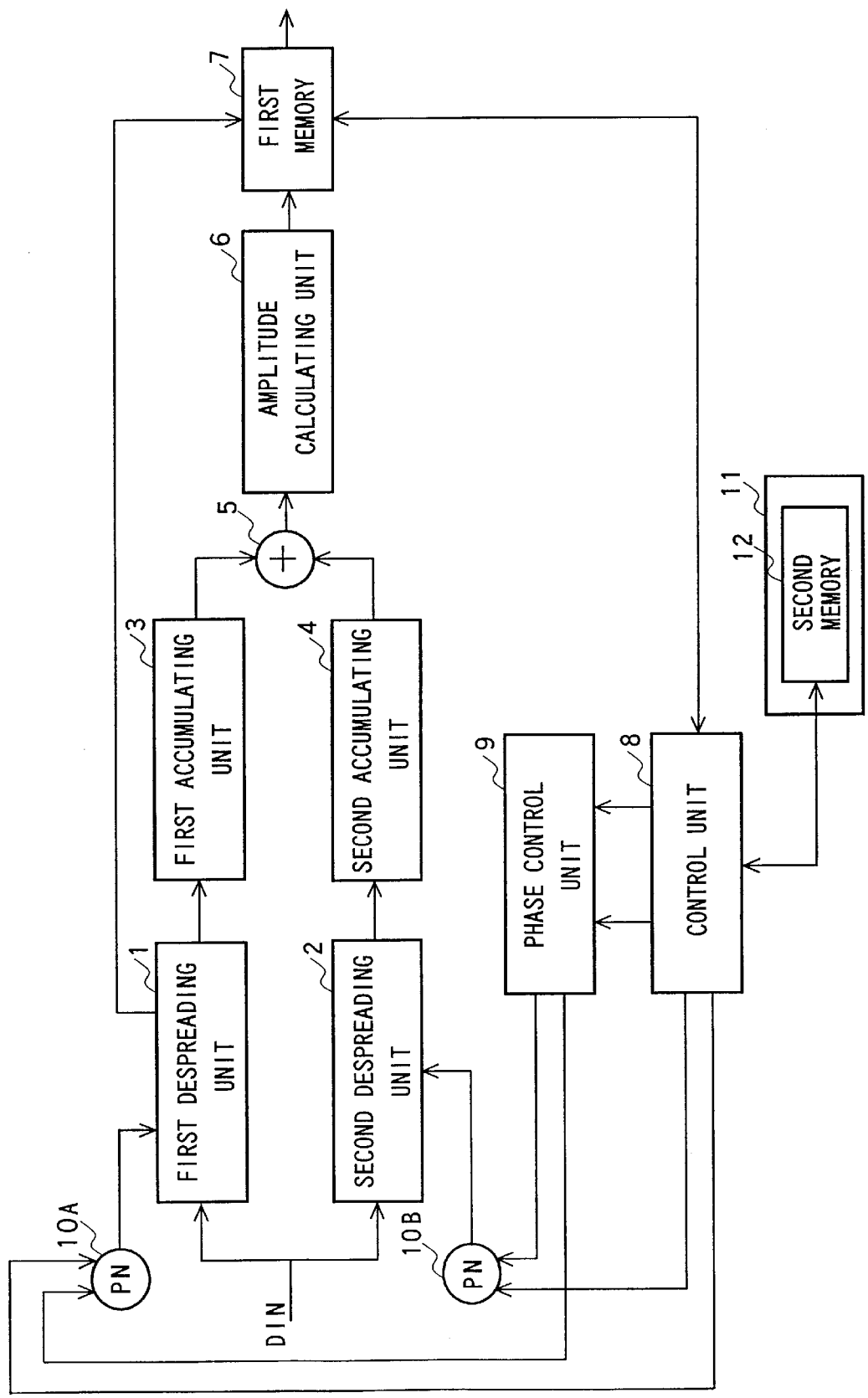
FIG. 1 is a block diagram of a synchronization acquiring apparatus according to the first embodiment of the present invention.

FIG. 1 shows a block diagram of a synchronization acquiring apparatus according to the first embodiment of the present invention. In FIG. 1, the synchronization acquiring apparatus is installed inside the mobile station. The synchronization acquiring apparatus has a first de-spreading unit 1 and a second de-spreading unit 2. A first accumulating unit 3 is connected to the first de-spreading unit 1. A second accumulating unit 4 is connected to the second de-spreading unit 2. An adder 5 is connected to the first accumulating unit 3 and the second accumulating unit 4. An amplitude calculating unit 6 is connected to the adder 5. A first memory 7 is connected to the amplitude calculating unit 6. The first de-spreading unit 1, a control unit 8, and the amplitude calculating unit 6 are connected to the first memory 7. A phase control unit 9, a first spreading code generator 10a, and a second spreading code generator 10b are connected to the phase control unit 9.

A second memory 12 installed inside a synchronization tracking apparatus 11 of the mobile station is connected to the control unit 8.

The first de-spreading unit 1 performs a spreading demodulation on the input data Din input from the input unit using the sliding correlating system. The first accumulating unit 3 accumulates demodulated data that has been spread and demodulated by the first de-spreading unit 1. The second de-spreading unit 2 has the same structure as the first de-spreading unit 1, and the second accumulating unit 4 has the same structure as the first accumulating unit 3. The first de-spreading unit 1, the second de-spreading unit 2, the first accumulating unit 3, and the second accumulating unit 4 can be conventional apparatuses.

The adder 5 adds up the cumulative data output from the first accumulating unit 3 and the second accumulating unit 4.

The amplitude calculating unit 6 calculates the amplitude of the cumulative data. The cumulative data output from the first accumulating unit 3 and the second accumulating unit 4 is normally represented by a complex number having an imaginary part. The amplitude calculating unit 6 outputs the absolute value of the complex number as a correlation value.

The first memory 7 selects the largest and second largest correlation values from the correlation values supplied from the amplitude calculating unit 6, and stores these selected correlation values and the phases of the spreading code that correspond to these two selected correlation values. Here, the phase of the spreading code that corresponds to a correlation value refers to the spreading code that is multiplied with the input data Din in the first de-spreading unit 1 or second de-spreading unit 2 so as to generate the correlation value. The first memory 7 then compares the two stored correlation values with the correlation values that are sequentially supplied to the first memory 7. If any of the correlation values that are sequentially supplied to the first memory 7 is larger than the smaller of the two stored correlation values, then the first memory 7 replaces the smaller of the two stored correlation values with the correlation value newly supplied to the first memory 7, and then stores the phase of the spreading code that corresponds to the newly supplied correlation value. The phase of the spreading code stored in the first memory 7 is supplied from the first de-spreading unit 1.

The control unit 8 receives the two correlation values and the corresponding two phases from the first memory 7 at a prescribed timing. The control unit 8 then compares the larger of the two correlation values with a threshold value preset in the control unit 8. If the correlation value is smaller than the threshold value, the control unit 8 judges that the synchronization acquiring operation is not completed yet. When the synchronization acquiring operation is not completed yet, the control unit 8 outputs to the spreading code generating units 10a and 10b a reset signal for repeating the synchronization acquiring operation. The spreading code generating units 10a and 10b receive the reset signal from the control unit 8. When the spreading code generating units 10a and 10b output a spreading code to the first de-spreading unit 1 and the second de-spreading unit 2, respectively, the spreading code generating units 10a and 10b slide the phases of the spreading code by the total bits of the spreading code, and then output the resultant spreading code to the first de-spreading unit 1 and the second de-spreading unit 2, respectively.

If the correlation value is larger than the threshold value, the control unit 8 judges that the synchronization acquiring operation is completed. In this case, the control unit 8 sends to the first memory 7 an instruction to output outside the apparatus the phase that corresponds to the maximum correlation value stored in the first memory 7 as output data Dout. The control unit 8 outputs to the second memory 12 inside the synchronization tracking apparatus 11 the two correlation values and the two phases received from the first memory 7. The synchronization tracking apparatus 11 starts a synchronization tracking operation based on the two correlation values and the two phases supplied to the second memory 2. The synchronization tracking apparatus 11 obtains correlation values during the synchronization tracking operation, and selects the largest and second largest correlation values, and acquires the phases of the spreading code that correspond to these correlation values. These two correlation values and two phases are stored in the second memory 12. The synchronization tracking apparatus 11 is a conventional apparatus, and can be realized using, for example, a PLL circuit.

Figure 3:
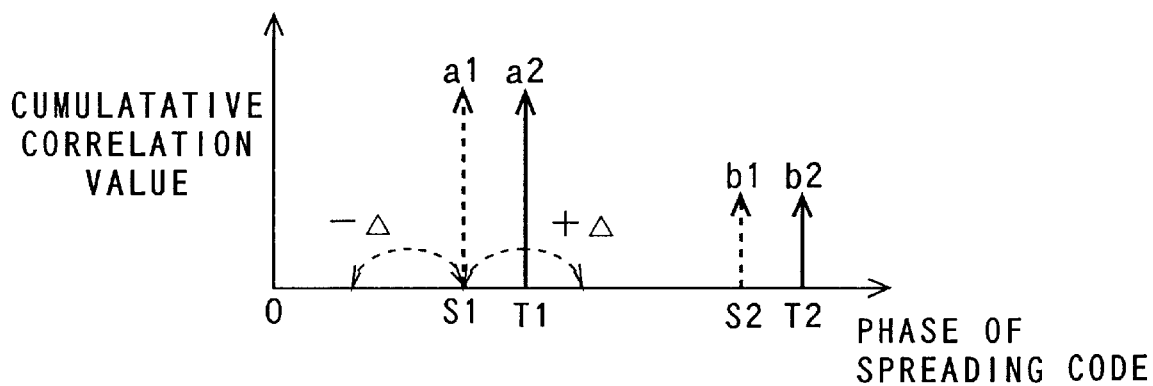
FIG. 3 shows another relation between the phases of the spreading code and the cumulative correlation values for explaining another operation of the synchronization acquiring apparatus according to the first embodiment of the present invention.

When the mobile station transits from the sleeping state to the active state, the control unit 8 receives the two correlation values and two phases from the second memory 12, and outputs the two phases to the phase control unit 9. The two correlation values and two phases in the second memory 12 have been stored before the mobile station was put into the sleep state. The phase control unit 9 supplies the phases input from the control unit 8 to the spreading code generating units 10a and 10b. The first spreading code generating unit 10a uses the phase input from the phase control unit 9 as the phase of the spread code that starts to be output to the first de-spreading unit 1 (hereafter this phase will be called the first starting phase), generates a spreading code, and slides the phases of the generated spreading code within the range of $\pm\Delta$ centered about the first starting phase (Note: $\pm\Delta$ are shown in FIG. 3. As will be explained later, the magnitude of $\Delta$ is a controllable parameter.). The second spreading code generating unit 10b uses the phase input from the phase control unit 9 as the phase of the spreading code that starts to be output to the second de-spreading unit 2 (hereafter this phase will be called the second starting phase).

The control unit 8 calculates the phase differences of the phases received from the second memory 12. Moreover, the control unit 8 controls the first and second spreading code generating units 10a and 10b, respectively, so that the phase differences of the spreading codes output from the first and second spreading code generating units 10a and 10b, respectively, will be equal to the phase differences calculated by the control unit 8.

The first de-spreading unit 1 multiplies the spreading code input from the first spreading code generating unit 10a with the input data and performs a spreading demodulation operation. Similarly, the second de-spreading unit 2 multiplies the spreading code input from the second spreading code generating unit 10b with the input data and performs a spreading demodulation operation.

Next, operations in the first embodiment will be explained.

Figure 2:
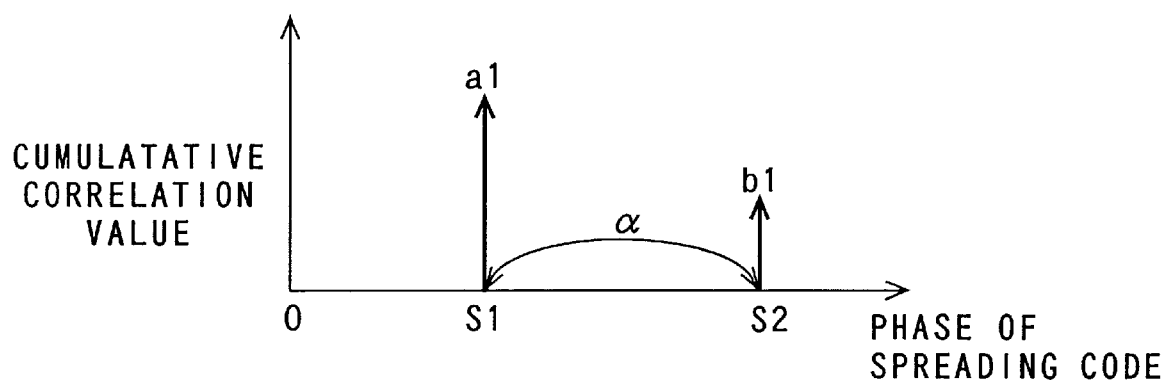
FIG. 2 shows a relation between the phases of the spreading code and the cumulative correlation values for explaining an operation of the synchronization acquiring apparatus according to the first embodiment of the present invention.

In FIG. 2, the horizontal axis represents the phases of the spreading code, and the vertical axis represents cumulative correlation values. The two solid line arrows a1 and b1 represent the two phases stored in the first memory 7 and the values that correspond to the two phases.

(When the Mobile Station Transits to the Active State for the First Time)

Here, it is assumed that the operator of the mobile station at rest has turned on the power source of the mobile station and started to operate the mobile station. In this case, a CPU installed in the mobile station detects that the power source of the mobile station has been turned on. Once it is detected that the power source of the mobile station has been turned on, the mobile station transits to the active state for the first time, and a synchronization acquiring operation is started as follows.

In FIG. 1, the synchronization acquiring apparatus performs a synchronization acquiring operation on the input data Din using the sliding correlating system. The control unit 8 sends a reset signal to the first and second spreading code generating units 10a and 10b, respectively. The first and second spreading code generating units 10a and 10b slide the phases by the front bit of the spreading code and output the spreading code of each of the phases. The first de-spreading unit 1 multiplies the spreading code with the input data Din and performs a spreading demodulation operation. Similarly, the second de-spreading unit 2 multiplies the spreading code with the input data Din and performs a spreading demodulation operation. The second spreading code generating unit 10b outputs to the second de-spreading unit 2 spreading code having the same phases as the spreading code of the first spreading code generating unit 10a.

The control unit 8 then judges that the synchronization acquiring operation has been completed.

In FIG. 2, it is assumed that two distinct correlation values a1 and b1 and two distinct phases S1 and S2 have been stored in the first memory 7 as a result of the synchronization acquiring operation. It is inferred that the electromagnetic wave carrying the input data transmitted from the base station that was caused to travel two distinct paths due to the influence of the surrounding environment was received by the mobile station, and as a result, these two distinct correlation values were generated by the difference between the lengths of the two paths. The two phases of the spreading code that correspond to the two distinct correlation values, respectively, are held constant as long as the operator remains at rest.

The control unit 8 receives the two distinct correlation values and two phases from the first memory 7 and outputs them to the second memory 12 inside the synchronization tracking apparatus 11.

(When the Mobile Station Transits from the Sleep State to the Active State)

Next, it is assumed that the mobile station was put to the sleep state and the operator has reset the mobile station to the active state while remaining at rest.

In FIG. 3, the horizontal axis represents the phases of the spreading code, and the vertical axis represents cumulative correlation values. The two broken line arrows a1 and b1 represent two correlation values that the synchronization tracking apparatus 11 stored in the second memory 12 before the mobile station was put to the sleep state. The two solid line arrows a2 and b2 represent two correlation values that the synchronization acquiring apparatus acquired when the mobile station transited from the sleep state to the active state.

In FIG. 1, the synchronization acquiring apparatus performs a synchronization acquiring operation on the input data Din in the following manner. The control unit 8 receives the two correlation values and two phases S1 and S2 (S1<S2) from the second memory 12, and outputs the two phases S1 and S2 to the phase control unit 9. The phase control unit 9 sends the phases S1 and S2 to the first spreading code generating unit 10a and the second spreading code generating unit 10b, respectively. The first spreading code generating unit 10a uses the phase S1 as the first starting phase, generates a spreading code, slides the phases of the generated spreading code within the range of $\pm\Delta$ centered about the first starting phase S1, and sends the spreading code to the first de-spreading unit 1. The first de-spreading unit 1 performs a spreading demodulation operation on the input data Din using the spreading code received from the first spreading code generating unit 10a.

The second spreading code generating unit 10b uses the phase S2 as the second starting phase, generates a spreading code, slides the phases of the generated spreading code within the range of $\pm\Delta$ centered about the second starting phase S2, and sends the generated spreading code to the second de-spreading unit 2. The second de-spreading unit 2 performs a spreading demodulation operation on the input data Din using the spreading code received from the second spreading code generating unit 10b. It is to be noted that the range $\pm\Delta$ in which the phases of the spreading code generated by the second spreading code generating unit 10b are slid is the same as the range $\pm\Delta$ in which the phases of the spreading code generated by the first spreading code generating unit 10a are slid. The remainder of the operation in this case is the same as in the case in which the mobile station transits to the active state for the first time.

In the case in which the mobile station was put to the sleep state and the operator has reset the mobile station to the active state while remaining at rest, the phase T1 that corresponds to the phase S1 in FIG. 3 is acquired. When the second de-spreading unit 2 performs the spreading demodulation operation on the input data Din using the phase T2 as the second starting phase, the second de-spreading unit 2 slides the phases while holding constant the phase difference $\alpha$ (=S2–S1) with respect to the phases slid by the first spreading code generating unit 10a. As a result, the correlation value b2 that corresponds to the phase T2 is acquired.

In the first embodiment, when the mobile station transits from the sleep state to the active state, the size of the range $\pm\Delta$ in which the phases of the spreading code to be spread on the input data are slid can be made smaller, that is, the size of $\Delta$ can be reduced. Therefore, the length of time required to perform the synchronization acquiring operation can be greatly reduced.

(Second Embodiment)

Next, a synchronization acquiring apparatus according to the second embodiment of the present invention will be explained.

Figure 4:
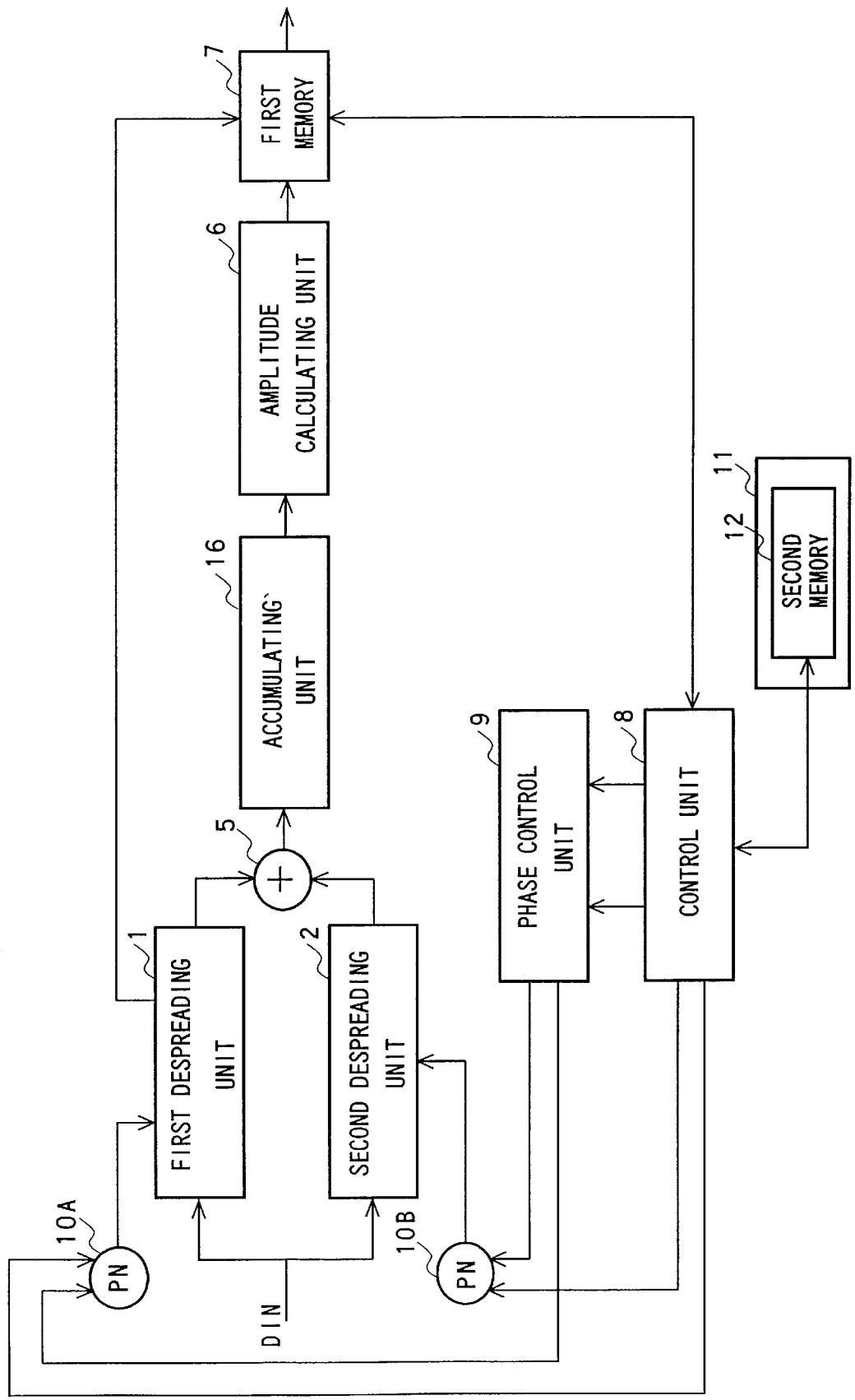
FIG. 4 is a block diagram of a synchronization acquiring apparatus according to the second embodiment of the present invention.

FIG. 4 is a block diagram of a synchronization acquiring apparatus according to the second embodiment of the present invention.

In the second embodiment of the present invention, the same reference numerals are given to the same components that are already used in the first embodiment. Such components will not be explained here. The synchronization acquiring apparatus of the second embodiment is identical to that of the first embodiment except in the following respects.

First, in the second embodiment shown in FIG. 4, the first accumulating unit 3 and the second accumulating unit shown in FIG. 1 are replaced with an accumulating unit 16 that is connected to the output side of the adder 5.

Second, in the second embodiment, the adder 5 calculates the sum of the output signal of the first de-spreading unit 1 and the output signal of the second de-spreading unit 2, and sends the sum to the accumulating unit 16. Since only one accumulating unit is used in the second embodiment in comparison with the first embodiment in which two accumulating units are used, the manufacturing cost of the apparatus can be reduced. Besides these two respects, the synchronization acquiring apparatus of the second embodiment can achieve the same advantages as that of the first embodiment.

(Third Embodiment)

Figure 5:
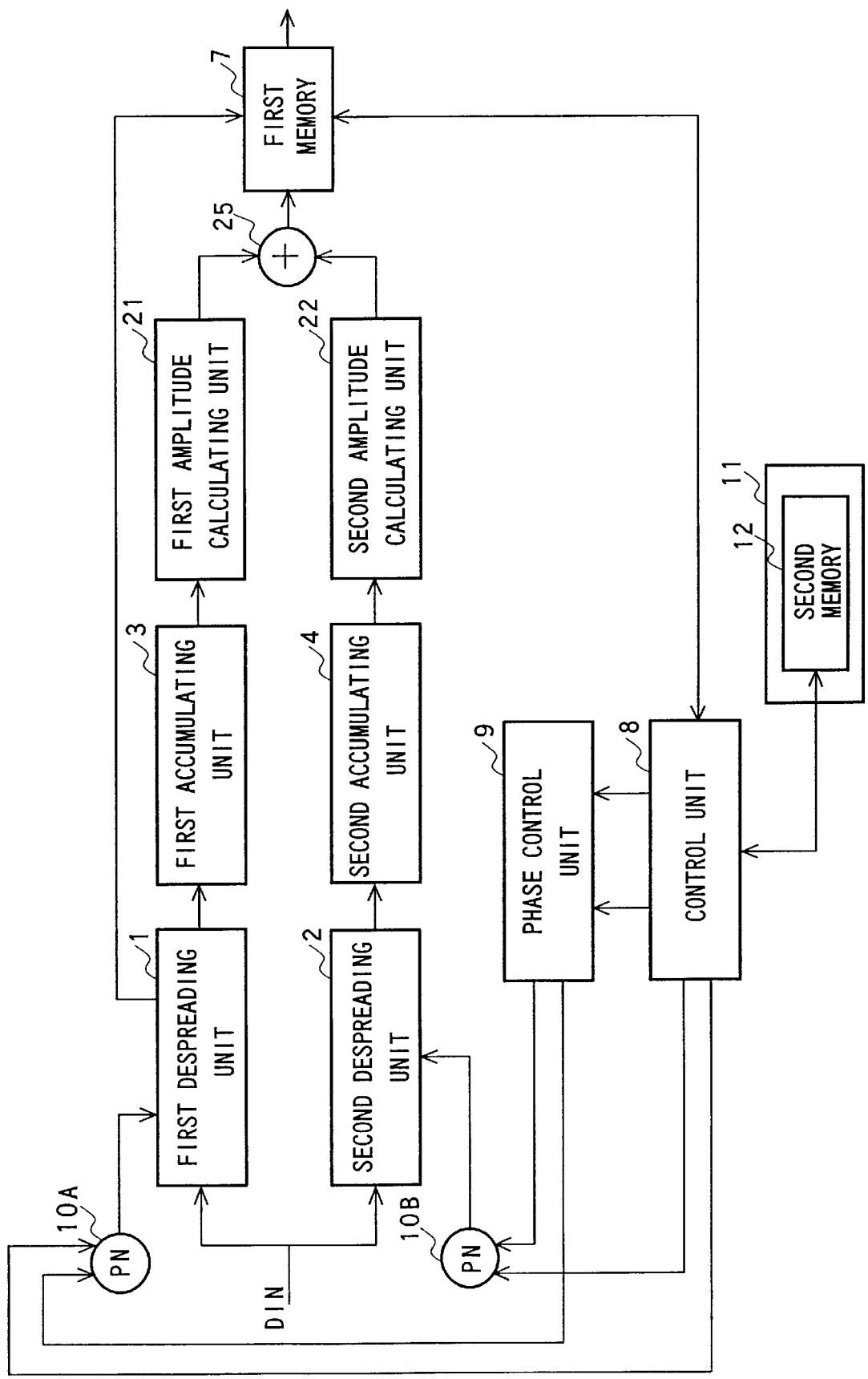
FIG. 5 is a block diagram of a synchronization acquiring apparatus according to the third embodiment of the present invention.

FIG. 5 is a block diagram of a synchronization acquiring apparatus according to the third embodiment of the present invention.

In the third embodiment of the present invention, the same reference numerals are given to the same components that are already used in the first embodiment. Such components will not be explained here. The synchronization acquiring apparatus of the third embodiment is identical to that of the first embodiment except in the following respects.

First, in the third embodiment shown in FIG. 5, the amplitude calculating unit 6 shown in FIG. 1 is replaced with a first amplitude calculating unit 21 connected to the output side of the first accumulating unit 3 and a second amplitude calculating unit 22 connected to the output side of the second accumulating unit 4. Both the first amplitude calculating unit 21 and the second amplitude calculating unit 22 are identically structured as the amplitude calculating unit 6. The adder 25 calculates the sum of the output signal of the first unit amplitude calculating 21 and the output signal of the second amplitude calculating unit 22, and sends the sum to the first memory 7.

The synchronization acquiring apparatus of the third embodiment functionally differs from that of the first embodiment in the following respect.

In the first embodiment, the signals input to the adder 5 are normally complex-valued signals, that is, they are vector-valued signals having imaginary parts. In the third embodiment, the signals input to the adder 25 are the absolute values of complex-valued signals, that is, they are scalar-valued signals.

In the synchronization acquiring apparatus of the third embodiment, the adder 25 calculates the sum of scalar-valued signals. Therefore, the synchronization acquiring apparatus of the third embodiment is able to obtain cumulative correlation values that are more stable than those obtained by the synchronization acquiring apparatus of the first embodiment. Besides this respect, the synchronization acquiring apparatus of the third embodiment can achieve the same advantages as that of the first embodiment.

(Fourth Embodiment)

Figure 6:
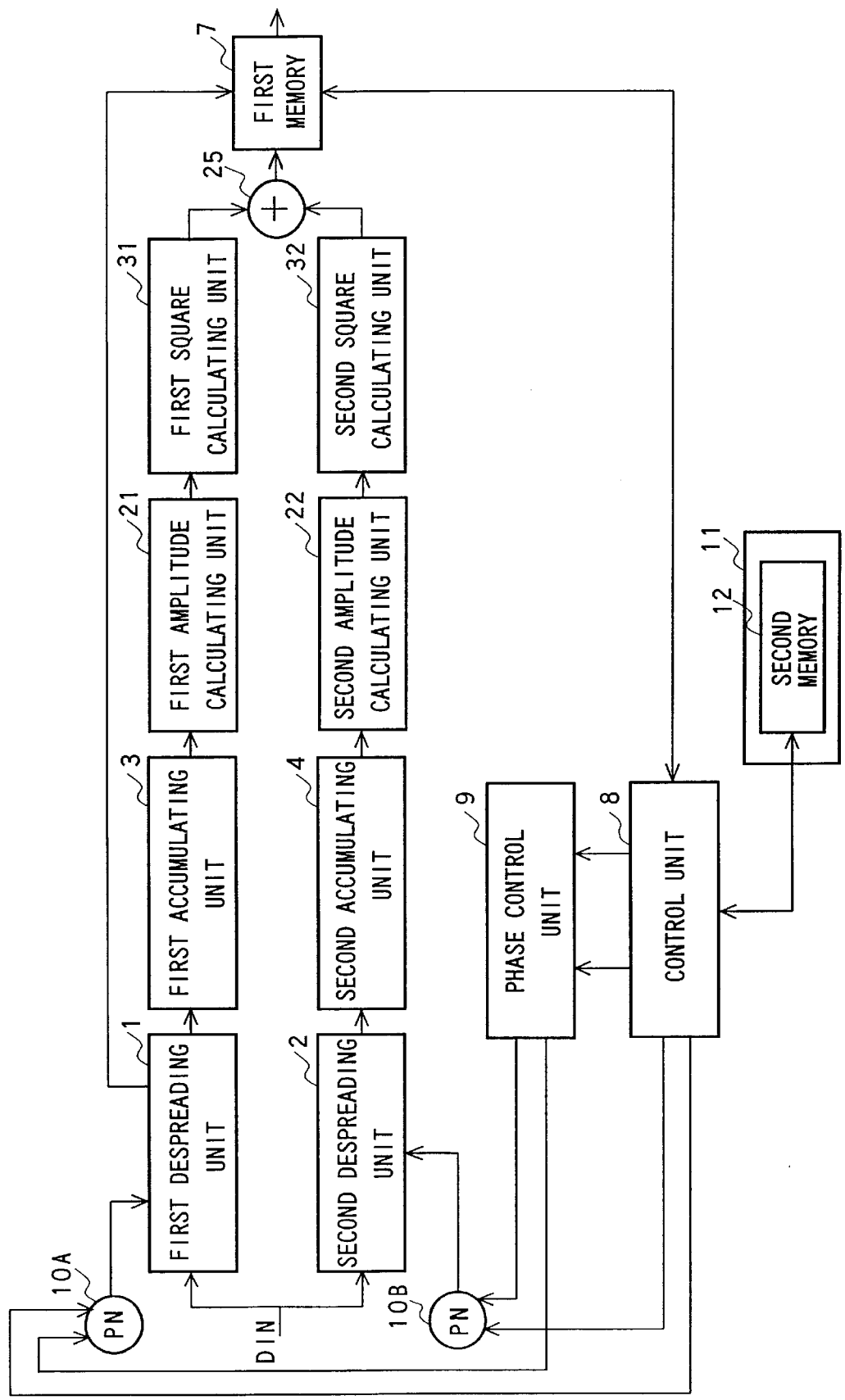
FIG. 6 is a block diagram of a synchronization acquiring apparatus according to the fourth embodiment of the present invention.

FIG. 6 is a block diagram of a synchronization acquiring apparatus according to the fourth embodiment of the present invention.

In the fourth embodiment of the present invention, the same reference numerals are given to the same components that are already used in the third embodiment. Such components will not be explained here. The synchronization acquiring apparatus of the fourth embodiment is identical to that of the third embodiment except in the following respect.

In the synchronization acquiring apparatus of the fourth embodiment shown in FIG. 6, a first square calculating unit 31 is installed between the first amplitude calculating unit 21 and the adder 25, and a second square calculating unit 32 is installed between the second amplitude calculating unit 22 and the adder 25.

In FIG. 6, the correlation values output from the first amplitude calculating unit 21 are input to the first square calculating unit 31. The first square calculating unit 31 then calculates the squares of the correlation values. The calculation results (hereafter they will be referred to as squared correlation values) correspond to the electric energy of the input data Din. The second square calculating unit 32 is identically structured as the first square calculating unit 31.

In the fourth embodiment, the adder 25 calculates the sum of the squared correlation values. Therefore, the signal-to-noise ratio achieved by the synchronization acquiring apparatus of the fourth embodiment is better than that achieved by the synchronization acquiring apparatus of the third embodiment. Besides this respect, the synchronization acquiring apparatus of the fourth embodiment can achieve the same advantages as that of the third embodiment.

(Fifth Embodiment)

Figure 7:
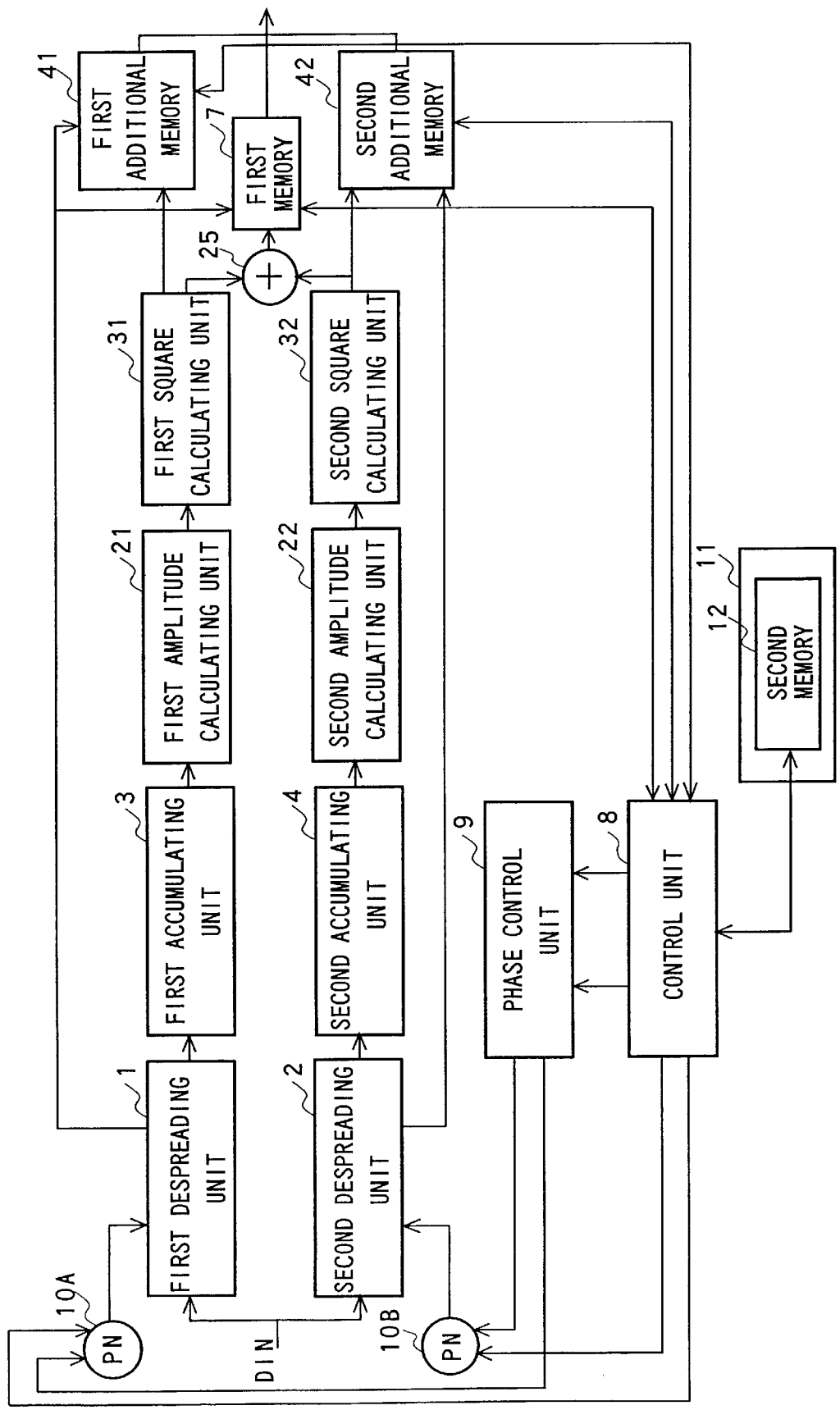
FIG. 7 is a block diagram of a synchronization acquiring apparatus according to the fifth embodiment of the present invention.

FIG. 7 is a block diagram of a synchronization acquiring apparatus according to the fifth embodiment of the present invention.

In the fifth embodiment of the present invention, the same reference numerals are given to the same components that are already used in the fourth embodiment. Such components will not be explained here. The synchronization acquiring apparatus of the fifth embodiment is identical to that of the fourth embodiment except in the following respect.

In the synchronization acquiring apparatus of the fifth embodiment shown in FIG. 7, a first additional memory 41 and a second additional memory 42 are installed in addition to all the components shown in FIG. 6.

The first additional memory 41 stores squared correlation values input from the first square calculating unit 31 and the two phases of the two spread codes that correspond to the largest and second largest correlation values. The second additional memory 42 stores squared correlation values input from the second square calculating unit 32 and the two phases of the two spreading codes that correspond to the largest and second largest correlation values. The two phases of the two spreading codes stored in the first additional memory 41 are supplied from the first de-spreading unit 1. The two phases of the two spreading codes stored in the second additional memory 42 are supplied from the second de-spreading unit 2.

The control unit 8 receives the correlation values and phases stored in the first additional memory 41 and the correlation values and phases stored in the second additional memory 42 at prescribed timings. The control unit 8 then compares the largest of these correlation values with a threshold value that is pre-set in the control unit 8.

If the largest of these correlation values is smaller than the threshold value, the control unit 8 judges that the synchronization acquiring operation is not completed yet.

If the largest of these correlation values is larger than the threshold value, the control unit 8 judges that the synchronization acquiring operation is completed. In this case, the control unit 8 outputs outside the apparatus the phase that corresponds to the largest of all the correlation values received from the first additional memory 41 and second additional memory 42 as output data Dout. Moreover, the control unit 8 outputs the largest and second largest correlation values of all the correlation values received from the first additional memory 41 and second additional memory 42 and the phases that correspond to these correlation values to the second memory 12 inside the synchronization tracking apparatus 11.

Next, the operation of the synchronization acquiring apparatus of the fifth embodiment will be explained.

(When the Mobile Station Transits to the Active State for the First Time)

In FIG. 7, the synchronization acquiring apparatus performs a synchronization acquiring operation on the input data Din using the sliding correlating system. The first spreading code generating unit 10a performs a spreading demodulation operation on the first de-spreading unit 1 sliding the spreading code from the phase of the leading spreading code by the number times that corresponds to half the spreading code length. The second spreading code generating unit 10b performs a spreading demodulation operation on the second de-spreading unit 2 sliding the spreading code from the phase of the midpoint of the spreading code length by the number times that corresponds to half the spreading code length.

The control unit 8 then judges that the synchronization acquiring operation has been completed.

In FIG. 2, it is assumed that the control unit 8 has obtained two correlation values a1 and b1 and two phases S1 and S2 as a result of the above-described synchronization acquiring operation. The control unit 8 outputs the two correlation values a1 and b1 and two phases S1 and S2 to the second memory 12.

(When the Mobile Station Transits from the Sleep State to the Active State)

Next, it is assumed that the mobile station was put to the sleep state and the operator has reset the mobile station to the active state while remaining at rest.

The control unit 8 receives the two correlation values a1 and b1 and two phases S1 and S2 (S1<S2) from the second memory 12. The control unit 8 then outputs the two phases S1 and S2 to the phase control unit 9. The phase control unit 9 sends the phases S1 and S2 to the first spreading code generating unit 10a and second spreading code generating unit 10b, respectively. The first spreading code generating unit 10a uses the phase S1 as the first starting phase, generates a spreading code, slides the phases of the generated spreading code within the range of $\pm\Delta$ centered about the first starting phase S1, and sends the spreading code to the first de-spreading unit 1. The first de-spreading unit 1 performs a spreading demodulation operation on the input data Din using the spreading code received from the first spreading code generating unit 10a.

The second spreading code generating unit 10b uses the phase S2 as the second starting phase, generates a spreading code, slides the phases of the generated spreading code within the range of $\pm\Delta$ centered about the second starting phase S2, and sends the generated spreading code to the second de-spreading unit 2. The second de-spreading unit 2 performs a spreading demodulation operation on the input data Din using the spreading code received from the second spreading code generating unit 10b. It is to be noted that the range $\pm\Delta$ in which the phases of the spreading code generated by the second spreading code generating unit 10b are slid is the same as the range $\pm\Delta$ in which the phases of the spreading code generated by the first spreading code generating unit 10a are slid. The remainder of the operation in this case is the same as in the case in which the mobile station transits to the active state for the first time.

The control unit 8 receives the two correlation values and two phases stored in the first additional memory 41 and the two correlation values and two phases stored in the second additional memory 42. The control unit 8 the selects then largest and second largest of the four correlation values, and calculates the difference between the phases that correspond to these two correlation values. This phase difference is denoted by T2–T1. On the other hand, the control unit 8 also calculates the difference S26–S1 between the two phases S1 and S2 stored in the second memory 12. If the phase difference T26–T1 is equal to the phase difference S2–S1, the control unit 8 judges that the mobile station was not moved while the mobile station was in the sleep state. In this case, the control unit 8 outputs outside the apparatus the phases stored in the first memory 7 as output data Dout.

If the phase difference T2–T1 is not equal to the phase difference S2–S1, the control unit 8 judges that the mobile station has been moved while the mobile station was in the sleep state. In this case, the control unit 8 supplies a reset signal to the first spreading code generating unit 10a and second spreading code generating unit 10b. Once the first spreading code generating unit 10a and second spreading code generating unit 10b receive the reset signal, they perform the same operation as in the case in which the power source of the mobile station has been turned on.

The synchronization acquiring apparatus according to the fifth embodiment is able to detect whether the mobile station has been moved or not when the mobile station transits from the sleep state to the active state. Moreover, regardless of whether the mobile station is moved while the mobile station is in the sleep state, the synchronization acquiring apparatus according to the fifth embodiment is able to detect the correlation values within a short length of time. Besides these features, the synchronization acquiring apparatus according to the fifth embodiment achieves the same advantages as the synchronization acquiring apparatus according to the fourth embodiment.

(Sixth Embodiment)

Next, a synchronization acquiring apparatus according to the sixth embodiment of the present invention will be explained.

Figure 8:
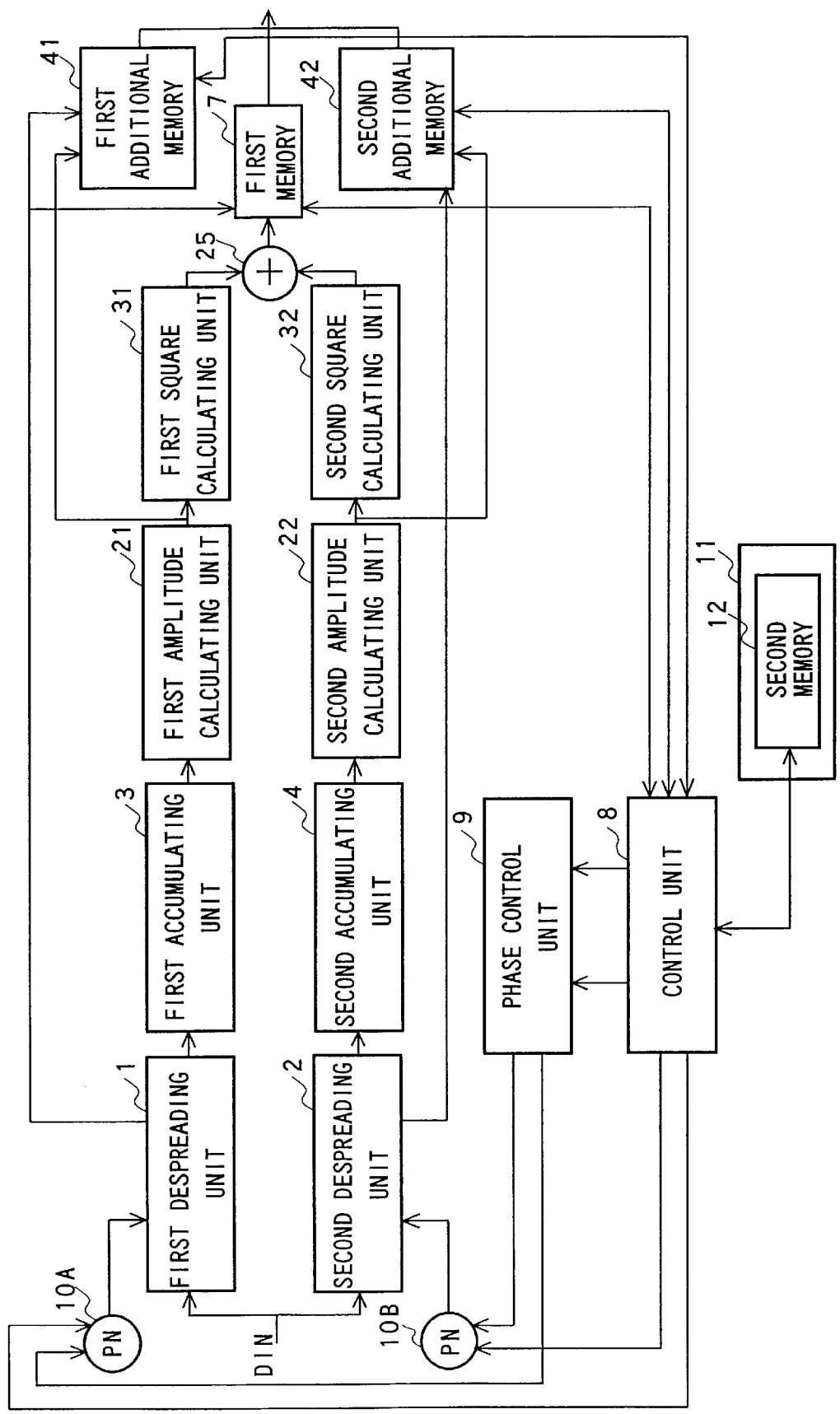
FIG. 8 is a block diagram of a synchronization acquiring apparatus according to the sixth embodiment of the present invention.

FIG. 8 is a block diagram of a synchronization acquiring apparatus according to the sixth embodiment of the present invention.

In the sixth embodiment of the present invention, the same reference numerals are given to the same components that are already used in the fifth embodiment. Such components will not be explained here. The synchronization acquiring apparatus of the sixth embodiment is identical to that of the fifth embodiment except in the following respect.

In the synchronization acquiring apparatus of the sixth embodiment shown in FIG. 8, the output signal of the first amplitude calculating unit 21 is input to the first additional memory 41, and the output signal of the second amplitude calculating unit 22 is input to the second additional memory 42. Besides these features, the synchronization acquiring apparatus according to the sixth embodiment achieves the same advantages as the synchronization acquiring apparatus according to the fifth embodiment.

What is claimed is:

1. A method of acquiring synchronization at a mobile station with a spread spectrum signal transmitted by a base station, said signal having a transmitted spreading code and containing input data, said method comprising the steps of:

placing the mobile station in a first active state:

generating at the mobile station a first receiver spreading code;

multiplying the input data of said spread spectrum signal with the first receiver spreading code thereby determining at least two first phases at which the phases of the transmitted spreading code and the first receiver spreading code coincide;

storing said at least two first phases;

placing the mobile station in a sleep state;

placing the mobile station in a second active state;

generating at the mobile station second receiver spreading codes, wherein said at least two first phases constitute starting phases;

multiplying the input data of said spread spectrum signal with said second receiver spreading codes thereby obtaining intermediate phases;

repeating the generating and multiplying steps until the phases of the transmitted spreading code and the intermediate phases of second receiver spreading codes coincide;

acquiring at least two second phases when the phases of the transmitted spreading code and the intermediate phases of second receiver spreading codes coincide; and obtaining correlation values from said second phases.

2. The method of claim 1, further comprising:

determining a difference $\Delta$ between the first phases and the intermediate phases; and wherein the generating step further comprises sliding the phases of the second receiver spreading code within a range of $\pm\Delta$ centered about the starting phases.

3. A synchronization acquiring apparatus, comprising:
a synchronization tracking apparatus;
a correlation storing unit receiving a correlation value between input data supplied from a base station and a spreading code multiplied to said input data and storing said correlation value and a phase of said spreading code that corresponds to said correlation value; and
an operation control unit determining whether a synchronization acquiring operation is complete based on said correlation value stored in said correlation storing unit, sending said phase to said synchronization tracking apparatus when said synchronization acquiring operation is complete, performing a control so as to repeat said synchronization acquiring operation when said synchronization acquiring operation is not complete, and receiving a plurality of said phases stored in said synchronization tracking apparatus to control said correlation storing unit using said phases stored in said synchronization tracking apparatus and phase differences between said phases stored in said synchronization tracking apparatus when a mobile station transits from a sleep state to an active state.

4. A synchronization acquiring apparatus, comprising:
a phase control unit generating a first starting phase and a second starting phase;
a control unit generating a control signal;
a first spreading code generating unit communicating with said phase control unit and said control unit and generating a first spreading code by sliding a phase of said first spreading code from said first starting phase over a prescribed range when receiving said first starting phase from said phase control unit, and generating said first spreading code by sliding said phase of said first spreading code over a prescribed range that corresponds to a length of said first spreading code when receiving said control signal from said control unit;
a first de-spreading unit communicating with said first spreading code generating unit and multiplying said first spreading code generated by said first spreading code generating unit with input data and outputting first demodulated data;
a second spreading code generating unit communicating with said phase control unit and said control unit and generating a second spreading code by sliding a phase of said second spreading code from said second starting phase over a prescribed range when receiving said second starting phase from said phase control unit, and generating said second spreading code by sliding said phase of said second spreading code over a prescribed range that corresponds to a length of said second spreading code when receiving said control signal from said control unit;
a second de-spreading unit communicating with said second spreading code generating unit and multiplying said second spreading code generated by said second spreading code generating unit with input data and outputting second demodulated data;
a correlation generating unit communicating with said first and second de-spreading units and outputting a correlation value between said input data and said first and second spreading codes based on said first demodulated data and said second demodulated data;
a first memory receiving a phase of a selected spreading code that generates a peak of said correlation value based on said correlation value from said first de-spreading unit and storing said correlation value and said phase of said selected spreading code; and
wherein said control unit receives said correlation value stored in said first memory, determines whether a synchronization acquiring operation is complete based on said correlation value, sends said phase stored in said first memory to a second memory installed inside a synchronization tracking apparatus when said synchronization acquiring operation is complete, sends a reset signal for repeating said synchronization acquiring operation to said first de-spreading unit and said second de-spreading unit when said synchronization acquiring operation is not complete, and reads at least two of said phases stored in said second memory of said synchronization tracking apparatus to output said phases and a phase difference between said phases when said mobile station transits from a sleep state to an active state, and
wherein said phase control unit uses said phases and said phase difference output from said control unit to output said first starting phase and said second starting phase.

5. A synchronization acquiring apparatus of claim 4, wherein said correlation generating unit comprises:
a first accumulating unit communicating with the first de-spreading unit and outputting a cumulative value of said first demodulated data as first cumulative data;
a second accumulating unit communicating with the second de-spreading unit and outputting a cumulative value of said second demodulated data as second cumulative data;
an adder receiving said first cumulative data and said second cumulative data and outputting a sum thereof; and
an amplitude calculating unit communicating with said adder and calculating an amplitude of said sum and outputting said amplitude as said correlation value.

6. A synchronization acquiring apparatus of claim 4, wherein said correlation generating unit comprises:
an adder communicating with said first and said second de-spreading units and calculating a sum of said first demodulated data and said second demodulated data;
an accumulating unit accumulating said sum calculated by said adder to produce a cumulative sum and outputting said cumulative sum as cumulative data; and
an amplitude calculating unit communicating with said accumulating unit, calculating an amplitude of said cumulative data and outputting said amplitude as said correlation value.

7. A synchronization acquiring apparatus of claim 4, wherein said correlation generating unit comprises:
a first accumulating unit communicating with the first de-spreading unit and outputting a cumulative value of said first demodulated data as first cumulative data;
a second accumulating unit communicating with the second de-spreading unit and outputting a cumulative value of said second demodulated data as second cumulative data;
a first amplitude calculating unit communicating with said first accumulating unit, calculating an amplitude of said first cumulative data and outputting said first cumulative data as a first correlation value;
a second amplitude calculating unit communicating with said second accumulating unit, calculating an amplitude of said second cumulative data and outputting said second cumulative data as a second correlation value; and an adder receiving said first correlation value and said second correlation value, calculating a sum of said first correlation value and said second correlation value, and communicating said sum to said correlation generating unit, which outputs said sum obtained by said adder as said correlation value.

8. A synchronization acquiring apparatus of claim 4, wherein said correlation generating unit comprises:

a first accumulating unit communicating with the first de-spreading unit and outputting a cumulative value of said first demodulated data as first cumulative data;

a second accumulating unit communicating with the second de-spreading unit and outputting a cumulative value of said second demodulated data as second cumulative data;

a first amplitude calculating unit communicating with said first accumulating unit, calculating an amplitude of said first cumulative data and outputting said first cumulative data as a first correlation value;

a second amplitude calculating unit communicating with said second accumulating unit, calculating an amplitude of said second cumulative data and outputting said second cumulative data as a second correlation value; and a first square calculating unit communicating with said first amplitude calculating unit, calculating a square of said first correlation value and outputting said square of said first correlation value as a first squared correlation value;

a second square calculating unit communicating with said second amplitude calculating unit, calculating a square of said second correlation value and outputting said square of said second correlation value as a second squared correlation value; and an adder receiving said first squared correlation value and said second squared correlation value, calculating a sum of said first squared correlation value and said second squared correlation value, and communicating said sum to said correlation generating unit, which outputs said sum obtained by said adder as said correlation value.

9. A synchronization acquiring apparatus of claim 8, further comprising:

a first additional memory receiving a phase of said first spreading code that generates a peak of said first squared correlation value based on said first squared correlation value from said first de-spreading unit and stores said phase; and a second additional memory receiving a phase of said second spreading code that generates a peak of said second squared correlation value based on said second squared correlation value from said second de-spreading unit and stores said phase, and wherein said control unit receives said phase stored in said first additional memory and said phase stored in said second additional memory, sends said phase stored in said first additional memory and said phase stored in said second additional memory to said second memory installed inside said synchronization tracking apparatus when said synchronization acquiring operation is complete, and reads at least two of said phases stored in said second memory of said synchronization tracking apparatus to output said phases and a phase difference between said phases when said mobile station transits from said sleep state to said active state.

10. A synchronization acquiring apparatus as claimed in claim 9, wherein said first additional memory receives a phase of said spreading code that generates a peak of said first squared correlation value based on said first correlation value from said first de-spreading unit and stores said phase, and said second additional memory receives a phase of said spreading code that generates a peak of said second squared correlation value based on said second correlation value from said second de-spreading unit and stores said phase.

\* \* \* \* \*